US012749682B2

(12) United States Patent
Narayanan et al.

(10) Patent No.: US 12,749,682 B2
(45) **Date of Patent: *Sep. 29, 2026**

(54) BINARY SUBSTITUTED VANADIUM PHOSPHATE ELECTRODE MATERIAL

(71) Applicant: HINDUSTAN PETROLEUM CORPORATION LIMITED, Tarabahalli (IN)

(72) Inventors: Krishnamurthy Narayanan, Tarabahalli (IN); Rajkumar Kanakaraj, Tarabanahalli (IN); Bojja Ramachandrarao, Tarabahalli (IN)

(73) Assignee: HINDUSTAN PETROLEUM CORPORATION LIMITED, Bengaluru (IN)

( * ) Notice: Subject to any disclaimer, the term of this patent is extended or adjusted under 35 U.S.C. 154(b) by 634 days.

This patent is subject to a terminal disclaimer.

(21) Appl. No.: 18/319,147

(22) Filed: May 17, 2023

(65) Prior Publication Data

US 2024/0258519 A1 Aug. 1, 2024

(30) Foreign Application Priority Data

Jan. 19, 2023 (IN) ............................. 202341003812

(51) Int. Cl.

| | |
|---|---|
| ***H01M 4/58*** | (2010.01) |
| ***H01M 4/04*** | (2006.01) |
| ***H01M 4/62*** | (2006.01) |

(52) U.S. Cl.

CPC ....... *H01M 4/5825* (2013.01); *H01M 4/0471* (2013.01); *H01M 4/625* (2013.01)

(58) Field of Classification Search

None

See application file for complete search history.

(56) References Cited

U.S. PATENT DOCUMENTS

2024/0150176 A1* 5/2024 Wang .................. H01M 4/5825

FOREIGN PATENT DOCUMENTS

| | | |
|---|---|---|
| CN | 114156470 A | 3/2022 |
| CN | 114256446 A | 3/2022 |
| CN | 114538400 A | 5/2022 |

OTHER PUBLICATIONS

CN114256446andTransaltion (Year: 2022).*

* cited by examiner

*Primary Examiner* — Brian R Ohara

(74) *Attorney, Agent, or Firm* — CANTOR COLBURN LLP

(57) ABSTRACT

The present invention relates to an electrode material. More particularly, the present invention relates to a binary substituted vanadium phosphate electrode active material and a battery comprising the same.

11 Claims, 10 Drawing Sheets

BINARY SUBSTITUTED VANADIUM PHOSPHATE ELECTRODE MATERIAL

CROSS REFERENCE TO RELATED APPLICATION

This application claims the benefit of Indian Application No. 202341003812, filed Jan. 19, 2023, which is hereby incorporated by reference in its entirety.

FIELD OF THE INVENTION

The present invention relates to an electrode material. More particularly, the present invention relates to a binary substituted vanadium phosphate electrode active material and a battery comprising the same.

BACKGROUND OF THE INVENTION

Typically, in a secondary battery commonly employed for electrochemical energy conversion and storage, two electrodes and an electrolyte are commonly employed with electrochemical reactions proceeding at both electrodes with more or less significant changes in the composition of the electrolyte. Frequently constituents of the electrolyte solution are consumed or new ones are generated during electrochemical process in a cell. The associated changes in properties of the electrolyte are mostly unwelcome because they might, for e.g., result in reduced ionic conductivity and increased internal resistance of the device. For sustained performance of the cell, a certain minimum amount of electrolyte is essential.

Typical examples of metal-ion batteries reported in various studies include sodium, lithium, potassium, magnesium, calcium, and fluorine-ion batteries. In recent years, research on sodium-based secondary batteries using sodium instead of lithium has been re-examined. The reserves of sodium resources are abundant, and if it is possible to produce a secondary battery using sodium instead of lithium, the secondary battery may be produced at low costs. In addition, expensive nickel and cobalt may not be used as positive electrode materials for sodium-ion batteries, unlike lithium-ion batteries that essentially use nickel and cobalt as positive electrode materials. However, sodium secondary batteries have physical properties different from existing lithium secondary batteries, and thus show low properties in terms of output power and energy density. For efficient driving, it is important to construct a large-capacity storage system at a relatively low cost rather than a storage system having high energy and power densities.

In sodium ion batteries, the electrode material is a critical factor affecting battery performance and cost relative to other materials. The currently researched electrode material, a novel NASICON type sodium vanadium phosphate material, has excellent stability and relatively high specific capacity. However, the electrochemical properties, especially the conductivity and the high-rate long-cycle performance, of the vanadium sodium phosphate cathode material directly synthesized by chemical synthesis are limited. Further in this regard, materials such as layered transition metal oxides, tunnel type oxide materials, sulphates, polyanion compounds, phosphates, pyrophosphates, Prussian blue analogues, etc. have also been reported. Polyanion compounds especially phosphates with P—O bonds which are stronger and known to have very robust structure which will not undergo any structural change during charging and discharging. Therefore, various studies are being conducted to optimize the phosphate electrode material itself which would not only provide enhanced properties but also be used across different metal-ion batteries.

For instance, CN114256446A discloses a polyanion type positive electrode material. The electrode material disclosed here has a general formula: $A_3V_{2-m}B_m(PO_4)_{3-n}D_n/C$. The electrode material has been disclosed for application as a positive electrode material in metal-ion batteries.

CN114538400A relates to a multi-cation substituted phosphate electrode material. The element-doped sodium vanadium phosphate electrode material disclosed here has high proportion of sodium over other metals.

CN114156470A discloses a sodium-rich phase zinc vanadium sodium phosphate composite material. The material is represented by general formula: $Na_{3+x}V_{2-x}Zn_x(PO_4)_3/C$ (NVZP) and finds application as positive electrode (or cathode) in a sodium-ion battery. In particular, a preparation method is disclosed which requires mixing vanadium source, sodium source, phosphorus source and zinc source in a certain mole ratio and subjected to reaction under magnetic stirring. The electrode material finds application in sodium-ion battery.

Despite the above state of the art of electrode materials, developing a sodium-ion battery technology is still immature because of the inherent size of Na (1.02 Å), which is bigger than Li (0.72 Å). Although, all the components of the battery (such as cathode, anode, current collectors, electrolyte, and separator) contribute to the overall cell performance, cathode still remains crucial and highly desirable for imparting high voltage, capacity, and cyclic stability to the overall battery.

To summarize, there is an abundance of various polyanion based materials, such as $Na_3V_2(PO_4)_2F_3$ (NVPF), $Na_3V_2O_2(PO_4)F$ (NVOPF) and $Na_3V_2(PO_4)_3$ (NVP), which have high voltage, energy density and power density and also have excellent cycle stability. However, these materials contain a large amount of vanadium, and the high price of vanadium is a major obstacle to commercialization. The price of vanadium is similar to that of nickel. Therefore, it is essential to reduce the vanadium content for commercialization. Furthermore, it is also important to ensure that the resulting electrochemical properties of the electrode material are not compromised. Hence, there always remains a demand for providing suitable electrode materials which not only reduce the vanadium content but also result in acceptable or improved charge/discharge cycle characteristics while having improved discharge capacity and also being scalable to commercial level.

It was, therefore, an object of the present invention to provide an electrode material for metal-ion batteries effective in mitigating one or more of the challenges in the state of the art.

SUMMARY OF INVENTION

Surprisingly, it has been found that the above object is met by providing an electrode active material described hereinbelow.

Accordingly, the present invention provides an electrode active material of general formula 1:

$$A_{(3+x)}V_{(2-x)}B_x(PO_4)_{(3-(y/3))}C_y \quad (1)$$

wherein,

A is selected from Li, Na and K,

B is one of transition metal, post-transition metal, or alkaline earth metal,

C is selected from F, Cl, Br and I,

V is vanadium, $PO_4$ is phosphate, x is a real number ranging between 0.001 to 1.0, and y is a real number ranging between 0.001 to 1.0.

In an embodiment, B is selected from Mg, Ti, Cr, Al, Fe, Bi, Sr, Mn, Co, Ni, Cu, Zn, Sc, Tc, Pd, Mo, Sn, and W.

In another embodiment, x ranges between 0.01 to 0.5. In still another embodiment, y ranges between 0.01 to 0.2.

In yet another embodiment, the electrode active material is coated with one or more selected from the group consisting of electrically conductive carbon, precious metals, and metals.

In another aspect, the present invention relates to a method for producing the electrode active material. The method comprises the following steps: obtaining a solution comprising precursors of each of A, B, C, V, and $PO_4$, wherein A, B, C, V, and $PO_4$ are as defined above; mixing the solution at a temperature ranging between 60° C. to 120° C. to obtain a gel; drying the gel by freeze drying; and calcining the dried gel to obtain the electrode active material.

In an embodiment, the step of drying is carried out at a temperature ranging between −30° C. to −55° C. The solution further comprises a carbon source selected from citric acid, glucose, sucrose, fructose, ascorbic acid, lignin, polysaccharide, hydrolyzed starch, dextrin, and molasses. The method further comprises the step of grinding the dried gel, prior to the step of calcining the dried gel.

In another embodiment, the precursor of A is selected from the group consisting of lithium hydroxide, lithium carbonate, lithium perchlorate, sodium carbonate, sodium hydroxide, sodium dihydrogen phosphate, sodium oxalate, sodium citrate, sodium phosphate, disodium hydrogen phosphate, sodium chloride, sodium dodecylbenzene sulfonate, sodium sulfate, sodium nitrate, potassium hydroxide, potassium carbonate, potassium perchlorate, potassium chloride, potassium sulfate and potassium nitrate.

In yet another embodiment, the precursor of B is a hydroxide salt or a nitrate salt or a sulphate salt of one or more selected from the group consisting of Mg, Ti, Cr, Al, Fe, Bi, Sr, Mn, Co, Ni, Cu, Zn, Sc, Tc, Pd, Mo, Sn, and W.

In still another embodiment, the precursor of V is selected from the group consisting of ammonium metavanadate, vanadium pentoxide, vanadyl acetylacetonate, vanadyl sulfate, vanadium dioxide, and vanadium trioxide.

In another embodiment, the precursor of $PO_4$ is selected from the group consisting of monoammonium phosphate, diammonium phosphate, phosphoric acid, monosodium phosphate, ammonium phosphate, disodium phosphate and ammonium dihydrogen phosphate.

In another embodiment, the precursor of C is selected from the group consisting of potassium fluoride, sodium fluoride, ammonium fluoride, lithium fluoride, potassium chloride, sodium chloride, ammonium chloride, magnesium chloride, lithium chloride, potassium bromide, sodium bromide, ammonium bromide, lithium bromide, potassium iodide, sodium iodide, ammonium iodide, and lithium iodide.

In still another aspect, the present invention relates to an electrode material for metal ion battery comprising the above electrode active material.

In an embodiment, the electrode material further comprises a binder. The binder is selected from the group consisting of polyvinylidene fluoride, polyvinyl alcohol, polyacrylic acid, alginic acid, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, and fluorinated rubber.

In another embodiment, the electrode material further comprises an electrically conductive material selected from carbon black, acetylene black, ketjen black, reduced graphene oxide, and carbon nanotube.

In another aspect, the present invention relates to a method for producing the electrode material. The method comprises obtaining a slurry comprising the electrode active material, binder, and one or more selected from the group consisting of electrically conductive carbon, precious metals, and metals. The amount of the electrode active material ranges between 50 wt. % to 90 wt. %, and the amount of the binder ranges between 1 wt. % to 20 wt. %, said wt. % based on the total weight of the slurry. The method further comprises coating the slurry on the electrically conductive material followed by drying to obtain the electrode material.

In yet another aspect, the present invention relates to a metal-ion battery comprising the above electrode material.

DETAILED DESCRIPTION OF THE INVENTION

Figure 1A:
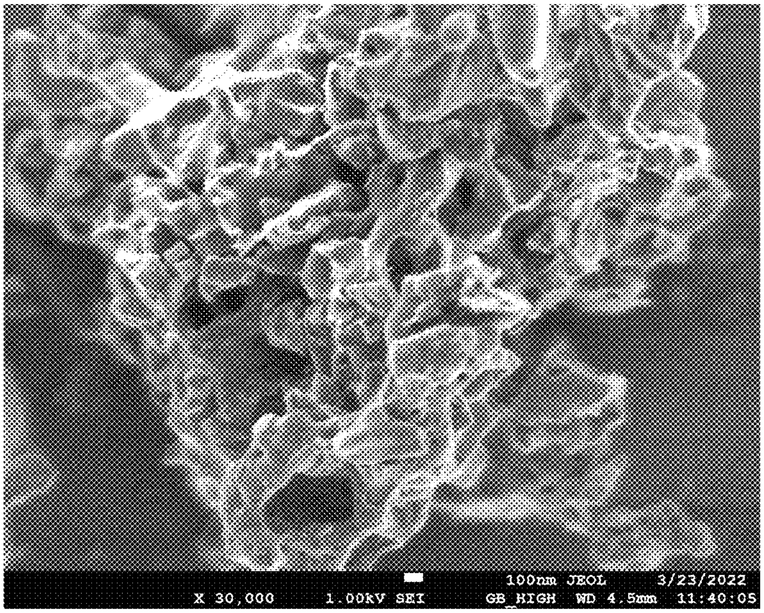
FIGS. 1(*a*) and 1(*b*) show Scanning Electron Microscope (SEM) images of NVZPF material in accordance with an embodiment of the present invention, and NVP material of the state-of-the-art.

Before the present invention is described, it is to be understood that the terminology used herein is not intended to be limiting since the scope of the presently claimed invention will be limited only by the appended claims.

The terms "comprising", "comprises" and "comprised of" as used herein are synonymous with "including". "includes" or "containing", "contains", and are inclusive or open-ended and do not exclude additional, non-recited members, elements or method steps. It will be appreciated that the terms "comprising", "comprises" and "comprised of" as used herein comprise the terms "consisting of". "consists" and "consists of".

Furthermore, the terms "first", "second", "third" or "(a)", "(b)", "(c)", "(d)", etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)", and "(C)" or "(a)", "(b)", "(c)", "(d)", "I", "ii", etc. relate to steps of a method or use or assay, there is no time or time interval coherence between the steps, that is, the steps may be carried out simultaneously or there may be intervals of seconds, minutes, hours, days, weeks, months, or even years between such steps, unless otherwise indicated in the application as set forth hereinabove or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment, but may. Further, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of this invention, and form different embodiments, as would be understood by those skilled in the art. For example, in the appended claims, any of the claimed embodiments can be used in any combination.

Furthermore, the ranges defined throughout the specification include the end values as well, i.e., a range of 1 to 10 implies that both 1 and 10 are included in the range. For the avoidance of doubt, the applicant shall be entitled to any equivalents according to applicable law.

As used herein, the terms "sodiate" and "sodiation" may refer to a process of adding sodium to the electrode active material.

As used herein, the terms "desodiate" and "desodiation" may refer to a process of removing sodium from the electrode active material.

As used herein, the terms "charge" and "charging" may refer to a process of providing electrochemical energy to a cell.

As used herein, the terms "discharge" and "discharging" refer to a process for removing electrochemical energy from a cell, for example, when using the cell to perform desired work.

As used herein, the term "positive electrode" may refer to an electrode (often called a cathode) where electrochemical reduction/sodiation occur during a discharging process.

As used herein, the term "negative electrode" may refer to an electrode (often called an anode) where electrochemical oxidation/desodiation occurs during a discharging process.

The present invention is directed towards an electrode active material.

The electrode active material is represented by general formula 1:

$$A_{(3+x)}V_{(2-x)}B_x(PO_4)_{(3-(y/3))}C_y \quad (1)$$

wherein,

A is selected from Li, Na and K,

B is one of transition metal, post-transition metal, or alkaline earth metal,

C is selected from F, Cl, Br and I,

V is vanadium, $PO_4$ is phosphate, x is a real number ranging between 0.001 to 1.0, and y is a real number ranging between 0.001 to 1.0.

The state-of-the-art discusses $Na_3V_2(PO_4)_3$, also known as NVP, and $Na_{3.2}V_{1.8}Zn_{0.2}(PO_4)_3$, also known as NVZP, as one of the most widely used material for metal-ion batteries, particularly sodium-ion batteries. NVP may interchangeably be referred to as "base material" throughout the description.

It has been observed through the present invention that doping NVP with certain elements of the Periodic Table results in improvement in the electrochemical properties over the base material. In this regard, each of A, B, and C represent elements from the Periodic Table. These elements are doped onto the base material to obtain the electrode active material of general formula 1.

In an embodiment, the substitution A is selected from Li, Na, and K, elements from the Periodic Table. Preferably, the substitution A is Na or sodium. Hence, the electrode active material with A as Na may be referred to as sodium vanadium phosphate electrode active material. The sodium vanadium phosphate electrode active material is further subjected to substitution with B and C elements and hence, it may be referred to as binary substituted sodium vanadium phosphate electrode active material.

Accordingly, in an embodiment the electrode active material of general formula 1a is $$Na_{(3+x)}V_{(2-x)}B_x(PO_4)_{(3-(y/3))}C_y \quad (1a)$$

wherein,

B is one of transition metal, post-transition metal, or alkaline earth metal,

C is selected from F, Cl, Br and I,

V is vanadium, $PO_4$ is phosphate, x is a real number ranging between 0.001 to 1.0, and y is a real number ranging between 0.001 to 1.0.

In another embodiment, the substitution B is one of transition metal, post-transition metal, or alkaline earth metal from the Periodic Table. Examples of suitable transition metals include Ti, Cr, Fe, Mn, Co, Ni, Cu, Zn, Sc, Tc, Pd, Mo, and W, as represented by Groups 3 to 12 of the Periodic Table. Examples of suitable post-transition metals include Al, Sn, and Bi, as represented by Groups 13 to 15 of the Periodic Table. Examples of suitable alkaline earth metals include Mg, Sr, and Ca, as represented by Group 2 of the Periodic Table.

In one embodiment, B is selected from Mg, Ti, Cr, Al, Fe, Bi, Sr, Mn, Co, Ni, Cu, Zn, Sc, Tc, Pd, Mo, Sn, and W. Preferably, B is selected from Mn, Co, Ni, Cu, and Zn. More preferably, B is Zn or zinc.

Accordingly, in an embodiment the electrode active material of general formula 1b is $$A_{(3+x)}V_{(2-x)}Zn_x(PO_4)_{(3-(y/3))}C_y \quad (1b)$$

wherein,

A is selected from Li, Na and K,

C is selected from F, Cl, Br and I,

V is vanadium, $PO_4$ is phosphate, x is a real number ranging between 0.001 to 1.0, and y is a real number ranging between 0.001 to 1.0.

In still another embodiment, the substitution C is selected from F, Cl, Br and I, halogens from the Periodic Table. Preferably, C is F or fluorine.

Accordingly, in an embodiment the electrode active material of general formula 1c is $$A_{(3+x)}V_{(2-x)}B_x(PO_4)_{(3-(y/3))}F_y \quad (1c)$$

wherein,

A is selected from Li, Na and K,

B is one of transition metal, post-transition metal, or alkaline earth metal,

V is vanadium, $PO_4$ is phosphate, x is a real number ranging between 0.001 to 1.0, and y is a real number ranging between 0.001 to 1.0.

In another embodiment, x is a real number ranging between 0.005 to 1.0, or 0.005 to 0.8, or 0.01 to 0.8. In still another embodiment, x ranges between 0.01 to 0.5, or 0.05 to 0.6, or 0.05 to 0.4. In yet another embodiment, x ranges between 0.1 to 0.4, or 0.1 to 0.3.

In a further embodiment, y is a real number ranging between 0.001 to 1.0, or 0.001 to 0.8, or 0.001 to 0.6. In another embodiment, y ranges between 0.001 to 0.4, or 0.001 to 0.2, or 0.005 to 0.2. In still another embodiment, y ranges between 0.01 to 0.2, or 0.03 to 0.1, or 0.05 to 0.07.

In one embodiment, the electrode active material may be coated with one or more selected from the group consisting of electrically conductive carbon, precious metals, and metals. This further improves the electrical conductivity of the material. In one of the preferred embodiments, the precious metal is selected from Au, Ag and Pt. In still another preferred embodiment, the metal is selected from Cu and Al Preferably, the electrode active material is coated with electrically conductive carbon as it increases electrical conductivity without significantly increasing the production cost and weight. Suitable examples of electrically conductive carbon include carbon black, carbon nanotubes, and graphene.

In another embodiment, the electrode active material is coated with carbon. For this, a carbon source is added while synthesizing the material. Suitable examples of carbon source include citric acid, glucose, sucrose, fructose, ascorbic acid, lignin, polysaccharide, hydrolyzed starch, dextrin, and molasses.

Another aspect of the present invention relates to a method for producing the electrode active material, as described above. Accordingly, the embodiments described hereinabove in respect of the electrode active material are applicable here as well.

In an embodiment, the method for producing the electrode active material comprises the following steps:

(a) obtaining a solution comprising precursors of each of A, B, C, V, and $PO_4$, wherein A, B, C, V, and $PO_4$ are as defined above, (b) mixing the solution at a temperature ranging between 60° C. to 120° C. to obtain a gel, (c) drying the gel by freeze drying, and (d) calcining the dried gel to obtain the electrode active material.

In one embodiment, the precursor of A is selected from the group consisting of lithium hydroxide, lithium carbonate, lithium perchlorate, sodium carbonate, sodium hydroxide, sodium dihydrogen phosphate, sodium oxalate, sodium citrate, sodium phosphate, disodium hydrogen phosphate, sodium chloride, sodium dodecylbenzene sulfonate, sodium sulfate, sodium nitrate, potassium hydroxide, potassium carbonate, potassium perchlorate, potassium chloride, potassium sulfate and potassium nitrate. In another embodiment, the precursor of A is selected from the group consisting of lithium hydroxide, lithium carbonate, sodium dodecylbenzene sulfonate, sodium sulfate, sodium nitrate, potassium hydroxide, potassium carbonate, potassium perchlorate, potassium chloride, potassium sulfate and potassium nitrate. In yet another embodiment, the precursor of A is selected from the group consisting of sodium dodecylbenzene sulfonate, sodium sulfate, and sodium nitrate. In a further embodiment, the precursor of A is sodium nitrate.

In another embodiment, the precursor of B is a hydroxide salt or a nitrate salt or a sulphate salt of one or more selected from the group consisting of Mg, Ti, Cr, Al, Fe, Bi, Sr, Mn, Co, Ni, Cu, Zn, Sc, Tc, Pd, Mo, Sn, and W. In yet another embodiment, the precursor of B is a nitrate salt of one or more selected from the group consisting of Mg, Ti, Cr, Al, Fe, Bi, Sr, Mn, Co, Ni, Cu, Zn, Sc, Tc, Pd, Mo, Sn, and W. Preferably, the precursor of B is zinc nitrate.

In another embodiment, the precursor of V or vanadium is selected from the group consisting of ammonium metavanadate, vanadium pentoxide, vanadyl acetylacetonate, vanadyl sulfate, vanadium dioxide, and vanadium trioxide. Preferably, the precursor of V is ammonium metavanadate.

In still another embodiment, the precursor of $PO_4$ or phosphate is selected from the group consisting of monoammonium phosphate, diammonium phosphate, phosphoric acid, monosodium phosphate, ammonium phosphate, disodium phosphate and ammonium dihydrogen phosphate. Preferably, the precursor of $PO_4$ is ammonium dihydrogen phosphate.

In a further embodiment, the precursor of C is selected from the group consisting of potassium fluoride, sodium fluoride, ammonium fluoride, lithium fluoride, potassium chloride, sodium chloride, ammonium chloride, magnesium chloride, lithium chloride, potassium bromide, sodium bromide, ammonium bromide, lithium bromide, potassium iodide, sodium iodide, ammonium iodide, and lithium iodide. In another embodiment, the precursor of C is selected from the group consisting of potassium fluoride, sodium fluoride, ammonium fluoride, lithium fluoride, potassium chloride, sodium chloride, ammonium bromide, lithium bromide, and lithium iodide. Preferably, the precursor of C is ammonium fluoride.

Accordingly, in an embodiment, the method for producing the electrode active material comprises the following steps:

(a) obtaining the solution comprising sodium nitrate, zinc nitrate, ammonium metavanadate, ammonium dihydrogen phosphate, and ammonium fluoride, (b) mixing the solution at a temperature ranging between 60° C. to 120° C. to obtain the gel, (c) drying the gel by freeze drying, and (d) calcining the dried gel to obtain the electrode active material.

Suitable amounts of the precursors of each of A, B, C, V, and $PO_4$ can be appropriately selected in order to obtain the compound of general formula 1. In an embodiment, the precursor of A is present in an amount ranging between 1 wt. % to 30 wt. % based on the total weight of the solution.

In another embodiment, the precursor of B is present in an amount ranging between 0.1 wt. % to 10 wt. % based on the total weight of the solution.

In yet another embodiment, the precursor of C is present in an amount ranging between 0.005 wt. % to 5 wt. % based on the total weight of the solution.

In still another embodiment, the precursor of V is present in an amount ranging between 1.0 wt. % to 20 wt. % based on the total weight of the solution.

In another embodiment, the precursor of $PO_4$ is present in an amount ranging between 5 wt. % to 30 wt. % based on the total weight of the solution.

In another embodiment, the solution further includes a carbon source. The carbon source reduces the vanadium ions in the solution. After calcination, the carbon source in the solution is converted to carbon having a uniform thickness over the surface of the electrode active material. This carbon coating improves the electronic conductivity of the material. Suitable examples of carbon source include citric acid, glucose, sucrose, fructose, ascorbic acid, lignin, polysaccharide, hydrolyzed starch, dextrin, and molasses. Preferably, the carbon source is citric acid.

Suitable amounts of carbon source are known to the person skilled in the art. However, in an embodiment, the carbon source may be added in an amount ranging between 10 wt. % to 50 wt. % based on the total weight of the solution.

Accordingly, in an embodiment, the method for producing the electrode active material comprises the following steps:

(a) obtaining a solution comprising precursors of each of A, B, C, V, and $PO_4$ and carbon source, wherein A, B, C, V, and $PO_4$ are as defined herein, (b) mixing the solution at a temperature ranging between 60° C. to 120° C. to obtain the gel, (c) drying the gel by freeze drying, and (d) calcining the dried gel to obtain the electrode active material.

The present method is based on sol-gel technique, wherein the above solution is mixed at temperature ranging between 60° C. to 120° C. and gel is obtained. In an embodiment, the temperature ranges between 60° C. to 110° C., or 60° C. to 100° C., or 60° C. to 90° C. In another embodiment, the duration for which the temperature is maintained ranges between 1 h to 12 h, or 2 h to 10 h, or 3 h to 8 h.

Suitable mixing means in the present context are known to the person skilled in the art. For instance, a stirrer may be employed for mixing the solution. Further, suitable solvents, surfactants and other additives used in the context of preparing electrode materials are also known to the person skilled in the art and may therefore be used in the present invention. Hence, the present invention is not limited by the same.

Once the gel is obtained, it is subjected to freeze drying. Suitable temperature for drying range between −30° C. to −55° C. Subsequently, the freeze-dried gel was ground into fine powders and subjected to calcination to obtain the electrode active material.

Calcination generally comprises heating the fine powders, typically in an inert atmosphere, for example nitrogen or helium or argon or a mixture thereof. Suitable temperature range for calcination range between 300° C. to 1000° C., or 300° C. to 950° C., or 300° C. to 900° C., for a duration ranging between 2 h to 12 h, or 2 h to 10 h, or 4 h to 10 h.

Another aspect of the present invention relates to an electrode material for a metal ion battery comprising the electrode active material, as described above. Accordingly, the embodiments described hereinabove in respect of the electrode active material are applicable here as well.

In an embodiment, the electrode material comprises a binder. In the present disclosure, the binder serves to facilitate the adhesion between the electrode active material and to improve the binding of the electrode active material to a current collector. Suitable binders are selected from the group consisting of polyvinylidene fluoride, polyvinyl alcohol, polyacrylic acid, alginic acid, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, and fluorinated rubber.

In another embodiment, a solvent for the binder may also be included. Suitable examples of the solvent include such as, but not limited to, N-methylpyrrolidone (NMP), acetone, ethanol and water.

In yet another embodiment, the electrode material comprises an electrically conductive material. As the electrically conductive material, any material that is generally used in a metal-ion battery may be used, and examples thereof include carbon-based materials such as carbon black, acetylene black, ketjen black, reduced graphene oxide, and carbon nanotube; metal-based materials such as metal powder or metal fibers such as copper, nickel, aluminum, and silver; electrically conductive polymers such as polyphenylene derivatives; or mixtures thereof. The content of the electrically conductive material that is used may be suitably controlled.

In an embodiment, the electrically conductive material is selected from carbon black, acetylene black, ketjen black, reduced graphene oxide, and carbon nanotube. Suitable particle size of the electrically conductive material is known to the person skilled in the art. However, the size should be selected in a manner that slurry preparation remains unaffected.

Yet another aspect of the present invention relates to a method for producing the electrode material, as described above. Accordingly, the embodiments described hereinabove in respect of the electrode material and the electrode active material are applicable here as well.

In an embodiment, the method for producing the electrode material comprises the following steps:

(a) obtaining a slurry comprising the electrode active material, binder, and one or more selected from the group consisting of electrically conductive carbon, precious metals, and metals, wherein the amount of the electrode active material ranges between 50 wt. % to 90 wt. %, and the amount of the binder ranges between 1 wt. % to 20 wt. %, said wt. % based on the total weight of the slurry, and (b) coating the slurry on the electrically conductive material followed by drying to obtain the electrode material.

Preferably, the slurry comprises electrode active material, binder, and electrically conductive carbon. The amount of the electrode active material in the slurry ranges between 50 wt. % to 90 wt. % based on the total weight of the slurry. In an embodiment, the amount ranges between 60 wt. % to 90 wt. %, or 70 wt. % to 90 wt. %.

The amount of the binder in the slurry ranges between 1 wt. % to 20 wt. % based on the total weight of the slurry. In an embodiment, the amount ranges between 5 wt. % to 20 wt. %, or 5 wt. % to 15 wt. %.

Additionally, the slurry also includes one or more selected from the group consisting of electrically conductive carbon, precious metals, and metals. Suitable amounts of these materials include 1 wt. % to 20 wt. % based on the total weight of the slurry. In an embodiment, the amount ranges between 5 wt. % to 20 wt. %, or 5 wt. % to 15 wt. %. In one of the preferred embodiments, the precious metal is selected from Au, Ag and Pt. In still another preferred embodiment, the metal is selected from Cu and Al.

In the present disclosure, the slurry is applied to the surface of electrically conductive material. In an embodiment, the slurry may coat the surface of the electrically conductive material to a suitable thickness, for instance less than 300 μm. The person skilled in the art is aware of suitable coating thickness and hence, the present invention is not limited by the same. Further, the step of drying is carried at a temperature ranging between 60° C. to 130° C.

Still another aspect of the present invention relates to a metal-ion battery comprising the electrode material, as described above, and an electrolyte. Accordingly, the embodiments described hereinabove in respect of the electrode material are applicable here as well. Suitable examples of metal-ion battery include sodium, lithium, potassium, magnesium, calcium, and fluorine-ion batteries.

The electrode material of the present invention may be employed in any metal-ion battery along with the typical components thereof, such as but not limited to, current collector, electrolyte and separator.

In the present disclosure, the current collector is not particularly limited as long as it has electrical conductivity without causing chemical changes in the battery. The current collector may be, for example, aluminum, nickel, titanium, fired carbon, copper or stainless steel, which may be optionally surface-treated with carbon, nickel, titanium, silver, or the like. Alternatively, the current collector may be an aluminum-cadmium alloy. In addition, fine irregularities may be formed on the surface of the current collector to enhance the binding force of the positive electrode active material to the surface, and the current collector may be used in various forms such as a film, a sheet, a foil, a net, a porous material, foam, and a non-woven fabric.

In the present disclosure, the electrolyte may include a liquid electrolyte, a gel polymer, a solid electrolyte, or a combination thereof. The liquid electrolyte may include a sodium salt, an organic solvent, or a combination thereof; and the gel electrolyte may include an organic solid electrolyte containing a polymer compound, an inorganic solid electrolyte, or a combination thereof. The solid electrolyte may include an organic solid electrolyte containing a polymer compound, an inorganic solid electrolyte, or a combination thereof.

In the present disclosure, when the electrolyte is a liquid electrolyte, it includes an electrolyte salt and a solvent.

The electrolyte salt that is used in the present invention includes one or more selected from the group consisting of sodium-containing hydroxides (e.g., sodium hydroxide (NaOH), etc.), borates (e.g., sodium metaborate ($NaBO_2$), borax ($Na_2B_4O_7$), boric acid ($H_3BO_3$), etc.), phosphates (e.g., sodium phosphate tribasic ($Na_3PO_4$), sodium pyrophosphate ($Na_2HPO_4$), etc.), chloric acid (e.g., $NaClO_4$, etc.), $NaAlCl_4$, $NaAsF_6$, $NaBF_4$, $NaPF_6$, $NaSbF_6$, $NaCF_3SO_3$, and $NaN(SO_2CF_3)_2$, sodium fluoride, sodium sulfate, sodium nitrate, and sodium lignosulfonate.

In addition, in the present disclosure, a solvent may be used without particular limitation, as long as it may serve as a medium through which ions involved in the electrochemical reaction of the battery may move. Specifically, the solvent may be an aqueous solvent such as water or an alcohol, or a non-aqueous solvent such as an ester solvent, an ether solvent, a ketone solvent, an aromatic hydrocarbon solvent, an alkoxyalkane solvent, or a carbonate solvent. It is possible to use one or a mixture of two or more selected from among these solvents.

Suitable solvents can be selected from the group consisting of trimethyl phosphate (TMP), triethyl phosphate (TEP), methyl ethyl carbonate, methylpropionate carbonate, ethyl propionate, ethyl acetate, ethyl methyl carbonate, methyl formate, propylene carbonate, ethylene carbonate, vinylene carbonate, fluoroethylene carbonate, methyl acetate, triethylene glycoldimethyl ether, dimethyl sulfone, dimethyl ether, ethylene sulfite, diethyl carbonate, dimethyl carbonate, propylene oxide, propylene sulfite, ethylene glycol monobutyl ether, ethylene glycol monomethyl ether, ethylene glycol monoethyl ether, propyl acetate, methyl butanone, methyl isobutylketone, toluene cyclohexanone, ethylene glycol dimethylether and Tetraethylene glycol dimethyl ether.

In the present disclosure, the separator separates the negative electrode and the positive electrode from each other, and provides a channel for metal ions to move, and any known separator may be used for this purpose. Said otherwise, it is possible to use a separator having excellent electrolyte solution moisturizing ability while having low resistance to electrolyte ion movement. For example, the separator may be selected from among glass microfibers, polyester, Teflon, polyethylene, polypropylene, polytetrafluoroethylene (PTFE), or combinations thereof, and may be in the form of nonwoven fabric or woven fabric. Preferably, a polyolefin-based polymer separator such as polyethylene or polypropylene is mainly used for metal-ion secondary battery, and a coated separator containing a ceramic component or a polymer material may also be used to ensure heat resistance or mechanical strength. Optionally, the separator may have a single-layer or multi-layer structure.

The electrode material in accordance with the present invention is assembled along with other components to obtain the secondary metal-ion battery.

Advantageously, the present invention provides for an improved electrode active material having good electrochemical performance in terms of rate capability and cyclability over NVP and NVZP. Further, the electrode active material of the present invention has fast charging-discharging capability with good cyclability. Moreover, the present invention provides for a facile fabrication of electrode material with minimal processing conditions using the sol-gel technique.

While the foregoing description discloses various embodiments of the disclosure, other and further embodiments of the invention may be devised without departing from the basic scope of the disclosure. The invention is not limited to the described embodiments, versions or examples, which are included to enable a person having ordinary skill in the art to make and use the invention when combined with information and knowledge available to the person having ordinary skill in the art.

Examples

The presently claimed invention is illustrated by the non-restrictive examples which are as follows:

Compounds:

| | |
|---|---|
| Precursor of A | Sodium nitrate ($NaNO_3$) |
| Precursor of B | Zinc nitrate ($Zn(NO_3)_2$) |
| Precursor of V | Ammonium metavanadate ($NH_4VO_3$) |
| Precursor of PO4 | Ammonium dihydrogen phosphate ($NH_4H_2PO4$) |
| Precursor of C | Ammonium fluoride ($NH_4F$) |
| Solvent | N-Methyl-2-pyrrolidone (NMP) |
| Surfactant | Cetyltrimethylammonium bromide (CTAB) |
| Binder | Polyvinylidene fluoride (PVDF) |
| Carbon source | Citric acid |
| were obtained from Sigma Aldrich | |
| Electrically conductive material | Carbon black having BET surface area ranging between 57-67 $m^2/g$, was obtained from Alfa Aesar |

Suitable amounts of $NH_4VO_3$, $Zn(NO_3)_2$, $NaNO_3$, $NH_4H_2PO_4$, $NH_4F$, citric acid and CTAB was added to deionized water until completely dissolved, to obtain a solution. Subsequently, the solution was kept under stirring at 80° C. for 6 h. The solution then turned into a gel. The gel was subsequently freeze dried and ground into fine powder.

Calcination of the fine powder at 350° C. for 5 h and 750/800/850° C. for 8 h in Argon atmosphere yielded the electrode active material. Table 1 below summarizes the amounts of various ingredients.

TABLE 1

| | Inv. Ex. 1 [$Na_{3.2}V_{1.8}Zn_{0.2}(PO_4)_{2.98}F_{0.06}$] | Inv. Ex. 2 [$Na_{3.1}V_{1.9}Zn_{0.1}(PO_4)_{2.96}F_{0.1}$] | Inv. Ex. 3 [$Na_{3.3}V_{1.7}Zn_{0.3}(PO_4)_{2.98}F_{0.06}$] |
|---|---|---|---|
| Ingredient | Amount (in g) | Amount (in g) | Amount (in g) |
| $NH_4VO_3$ | 3.16 | 3.33 | 2.98 |
| $Zn(NO_3)_2$ | 0.89 | 0.45 | 1.33 |
| $NaNO_3$ | 4.80 | 3.95 | 4.21 |
| $NH_4H_2PO_4$ | 5.14 | 5.10 | 5.15 |
| $NH_4F$ | 0.03 | 0.05 | 0.03 |
| Citric acid | 7.78 | 7.78 | 7.78 |
| CTAB | 0.55 | 0.55 | 0.55 |

Figure 1B:
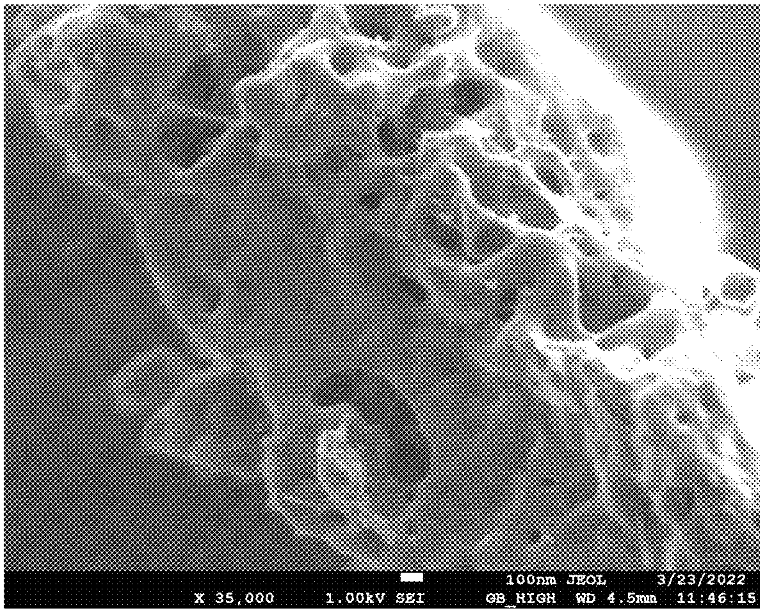

Comparative materials represented by $Na_3V_2(PO_4)_3$ (referred as and $Na_{3.2}V_{1.8}Zn_{0.2}(PO_4)_3$ (referred as NVZP) were prepared with the aforementioned ingredients. FIGS. 1(*a*) and 1(*b*) compare the SEM images of the present invention material (NVZPF) vs NVP. As observed, both NVP and NVZPF has similar morphology which is irregular and porous in nature. Particle sizes ranging between 5-10 μm are visible.

Figure 2:
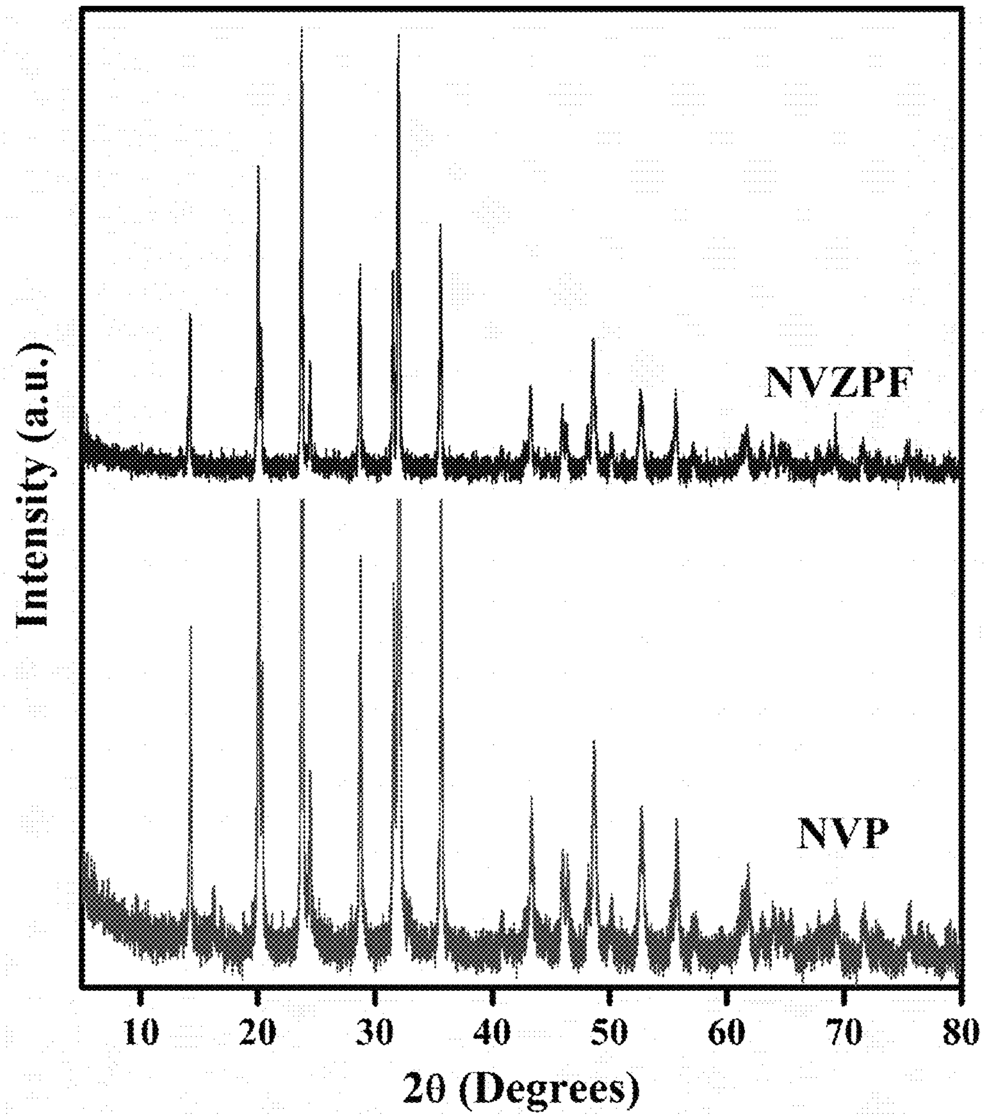
FIG. 2 shows X-ray diffraction (XRD) images of NVZPF material in accordance with an embodiment of the present invention, and NVP material of the state-of-the-art.

The XRD patterns of NVZPF and NVP, as shown in FIG. 2, reflect the rhombohedral structure of NVP which matched the standard JCPJDS card no 62-0345 with R3c space group. The XRD patter of NVZPF matches the standard NVP with no secondary phase formation, thereby indicating fine substitution of Zn and F over vanadium and phosphate sites. Thus, despite substitution of Zn and F, the crystal structure is unaltered.

A slurry was prepared with the electrode active material, electrically conductive material and binder in the weight ratio 80:10:10. Subsequently, the slurry was coated on the electrically conductive material and subjected to calendaring at temperature of 80° C. to obtain the electrode (cathode). Several samples of the electrode having 15 mm diameter were subsequently prepared for further testing.

Glass fiber separator was cut in to 19 mm diameter. The electrode samples and separators were transferred into an Argon filled glovebox. Half cells were fabricated with Na metal as the counter and reference electrode. 1M $NaClO_4$ in propylene carbonate with 5% fluoroethylene carbonate or 1M $NaClO_4$ in propylene carbonate with 5% vinylene carbonate was used as electrolyte.

Charge and discharge profile of sodium-ion battery using NVZPF material (Inv. Ex. 1-3)

Figure 3A:
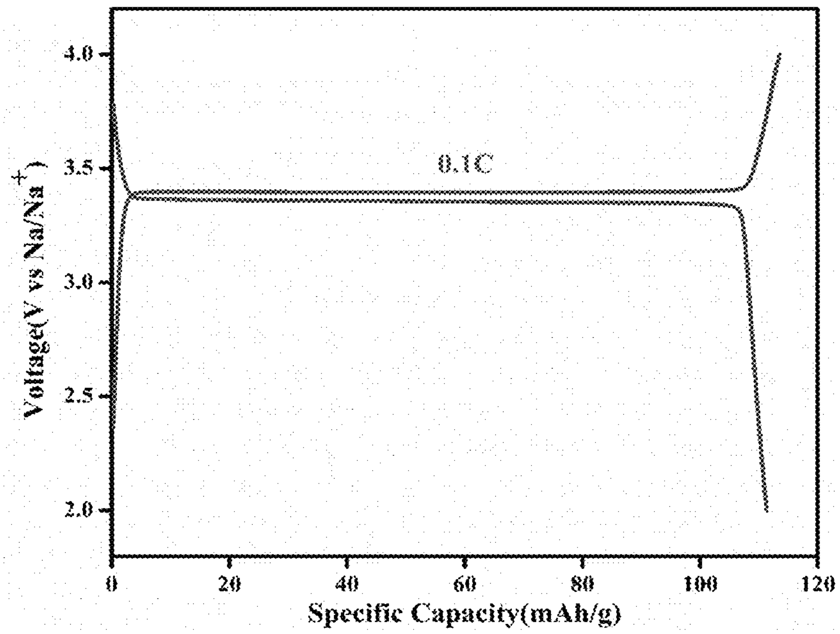
FIGS. 3(*a*)-(*c*) show charge and discharge profiles of NVZPF materials in accordance with various embodiments of the present invention at a current density of 0.1C.
Figure 3B:
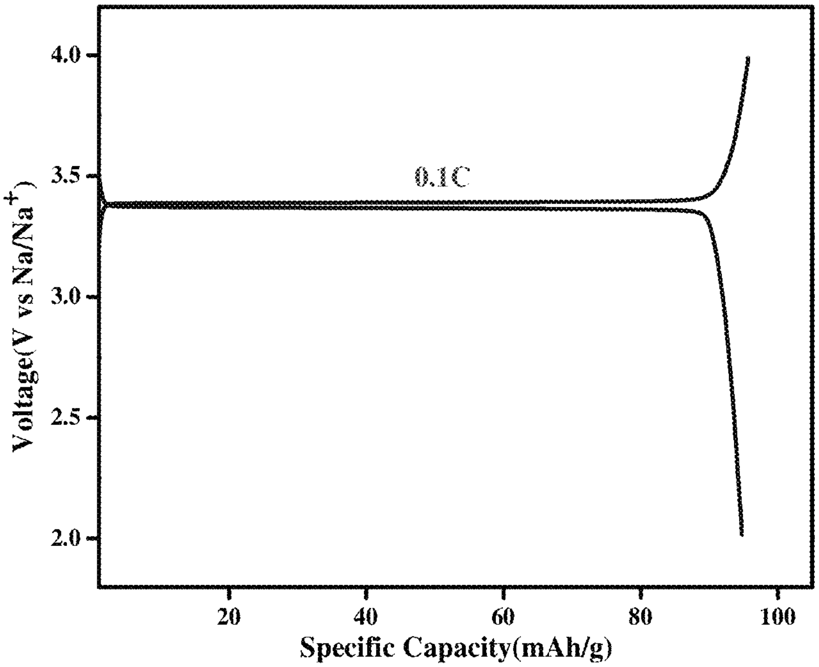
Figure 3C:
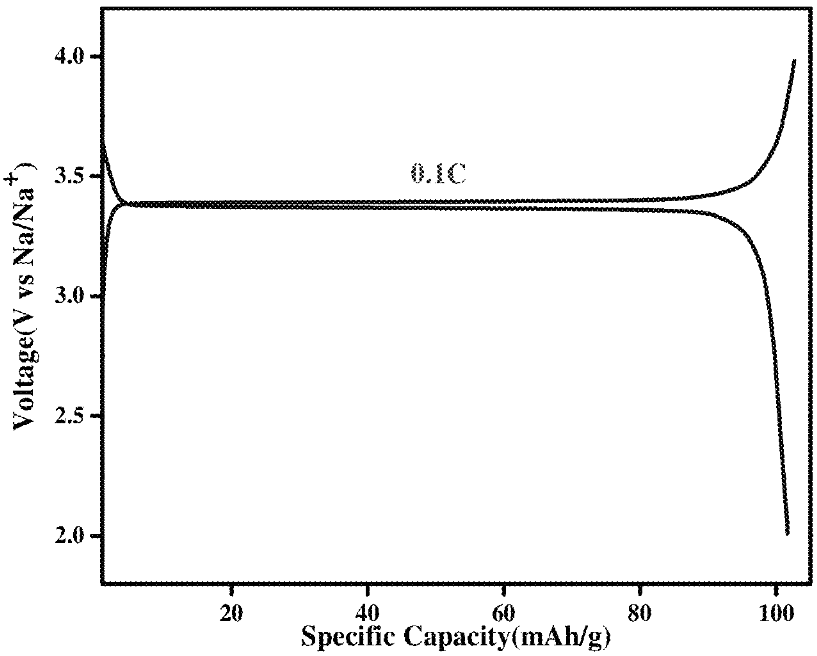

FIGS. 3(*a*) to (*c*) represent the galvanostatic charge-discharge profile of NVZPF materials (Inv. Ex. 1-3) at 0.1C rate. As evident in FIG. 3(*a*), the profile is similar to that of NVP. Further, a flat potential is observed at 3.4V, which is characteristic of redox reaction in a typical NVP material. The discharge capacity observed in FIG. 3(*a*) is 111 mAh/g.

Charge capacity and discharge capacity of sodium-ion battery using NVZPF material (Inv. Ex. 1-3)

Figure 4:
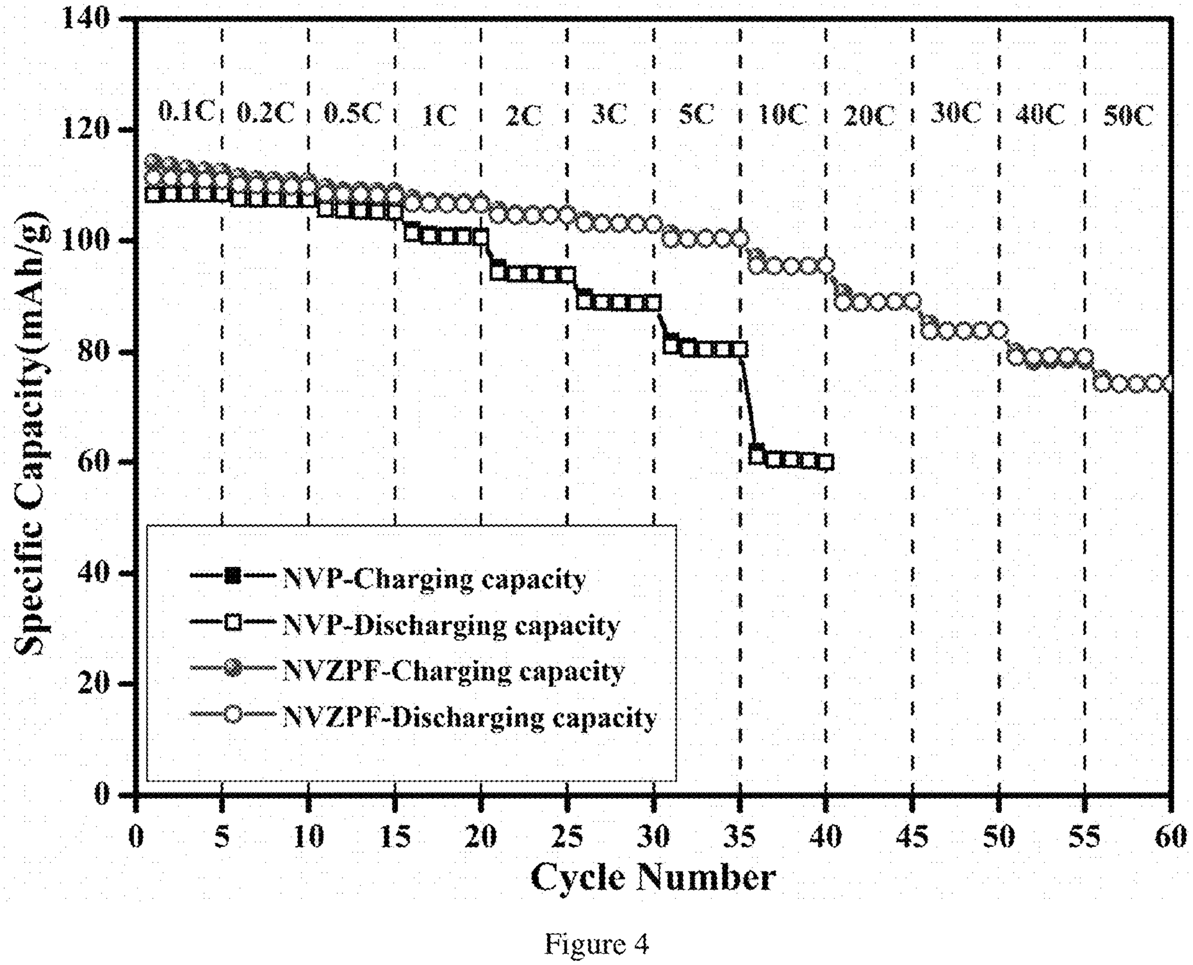
FIG. 4 shows changes in charge and discharge capacity of NVZPF material in accordance with an embodiment of the present invention vs NVP materials of the state-of-the-art, at various current densities (0.1C, 0.2C, 0.5C, 1C, 2C, 3C. 5C, 10C, 20C, 30C, 40C and 50C).

FIG. 4 depicts the rate performance comparison of standard NVP vis-à-vis NVZPF. It can be observed from the plot that NVZPF outperforms NVP with higher capacity at each C-rate tested. Of particular interest is the result observed at 50C rate, at which the NVZPF material showcases a capacity of 74 mAh/g.

Figure 5A:
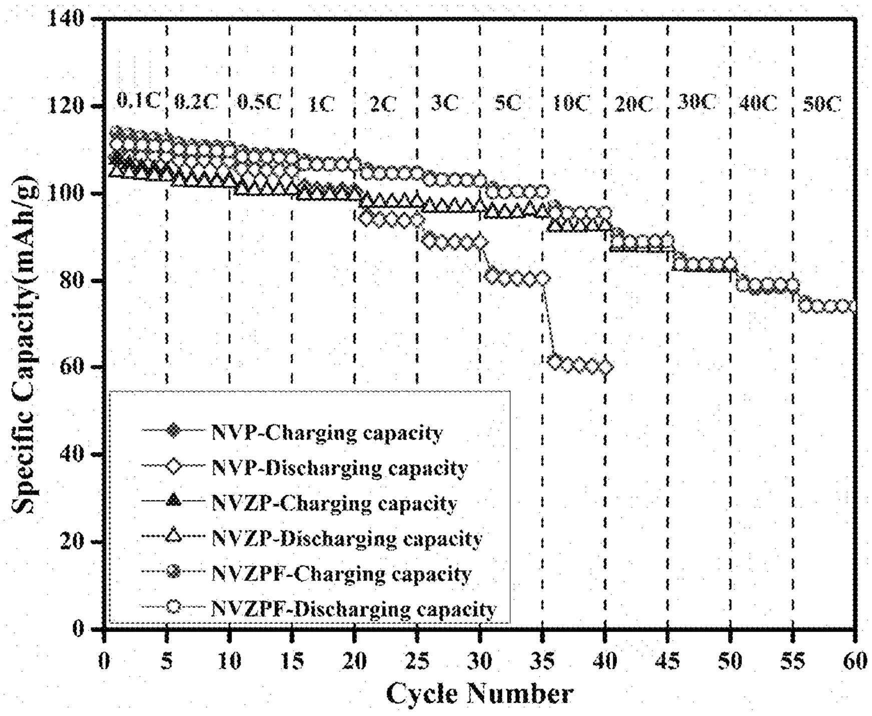
FIGS. 5(*a*)-(*c*) show changes in the charge and discharge capacity of NVZPF materials in accordance with various embodiments of the present invention vs NVP and NVZP materials of the state-of-the-art, at various current densities (0.1C, 0.2C, 0.5C, 1C, 2C, 3C. 5C, 10C, 20C, 30C, 40C and 50C).
Figure 5B:
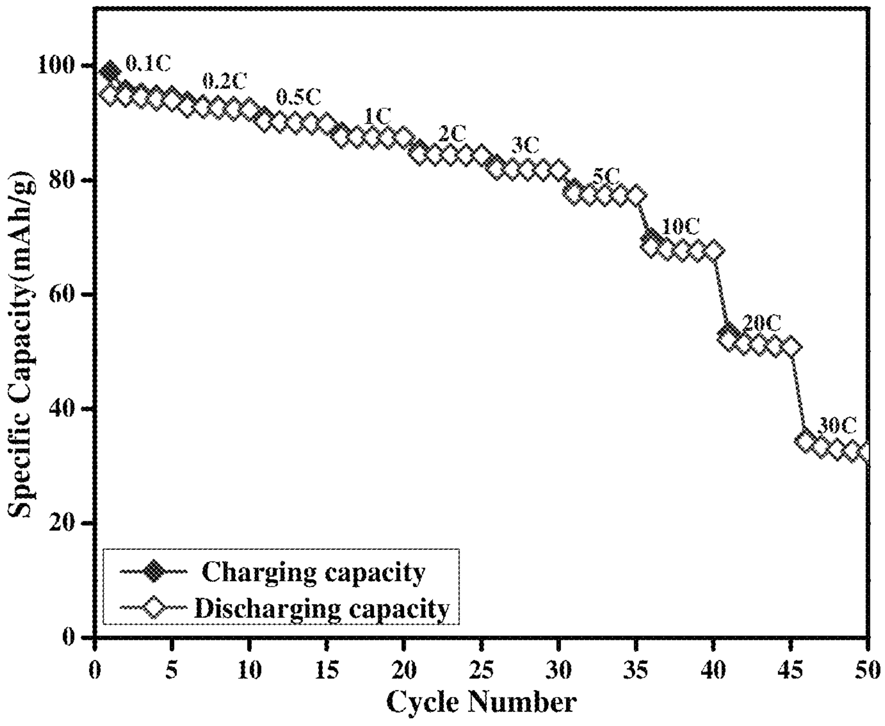
Figure 5C:
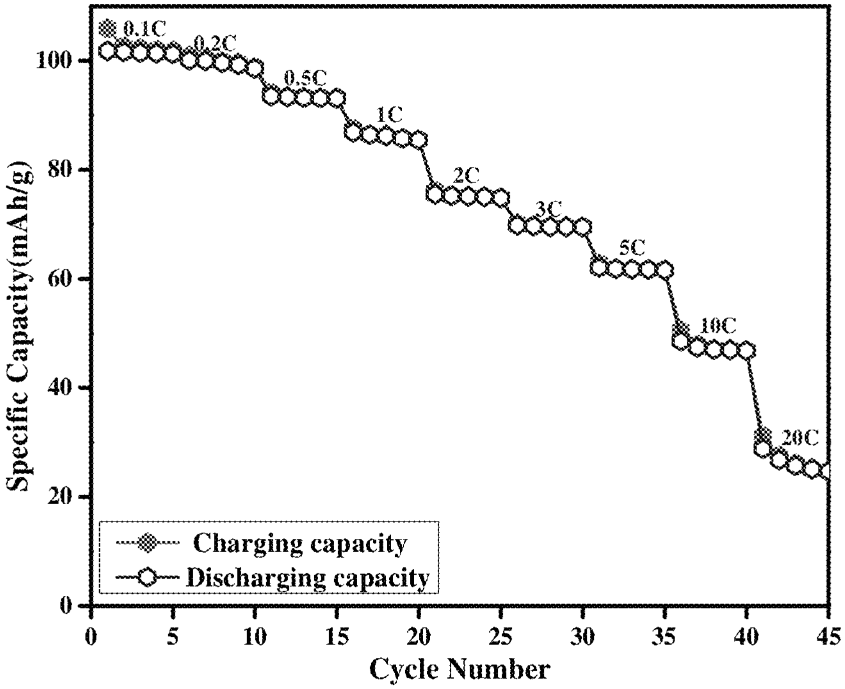

FIG. 5(*a*) depicts the rate performance comparison of NVP, NVZP and NVZPF. As observed, NVZPF outperforms both NVP and NVZP with higher capacities at each C-rate tested. Further, the NVZPF material shown in FIGS. 5(*a*) to (*c*) (corresponding to Inv. Ex. 1-3) possess higher capacity at both low and high C-rates.

Figure 6:
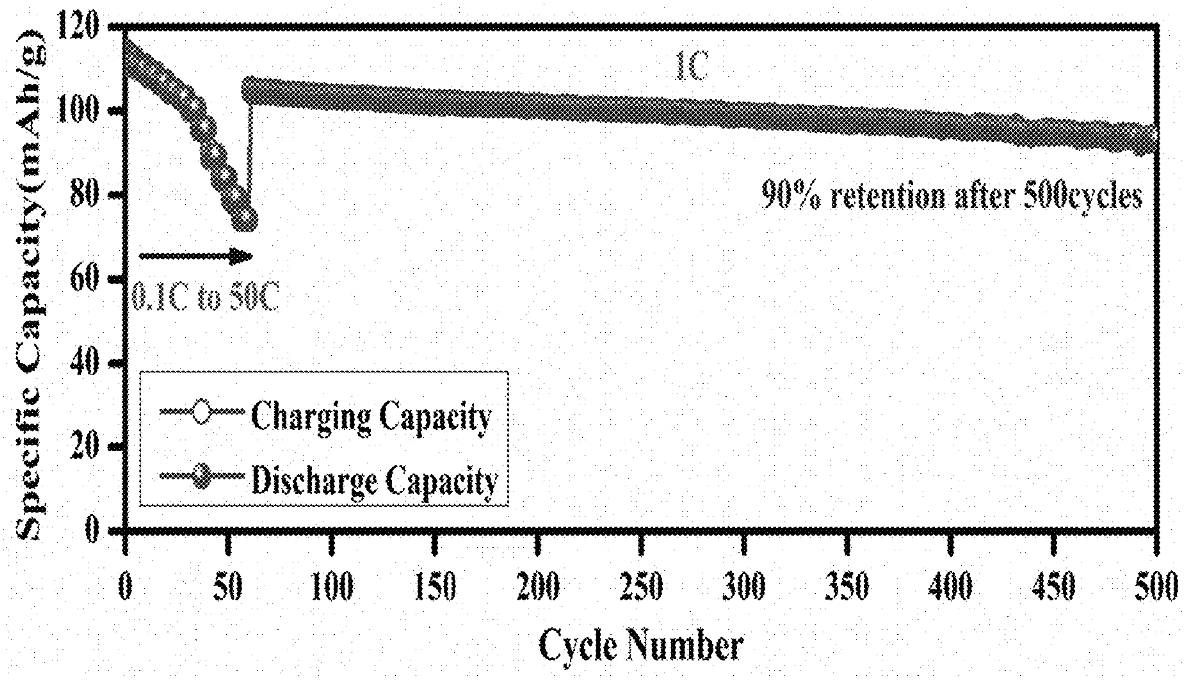
FIG. 6 shows rate performance and cycle performance at 1C rate of NVZPF material in accordance with an embodiment of the present invention.

FIG. 6 depicts the rate performance followed by cycling at 1C rate. It can be observed that the capacity regained to original value for NVZPF with 90% retention of capacity even after 500 cycles.

Figure 7A:
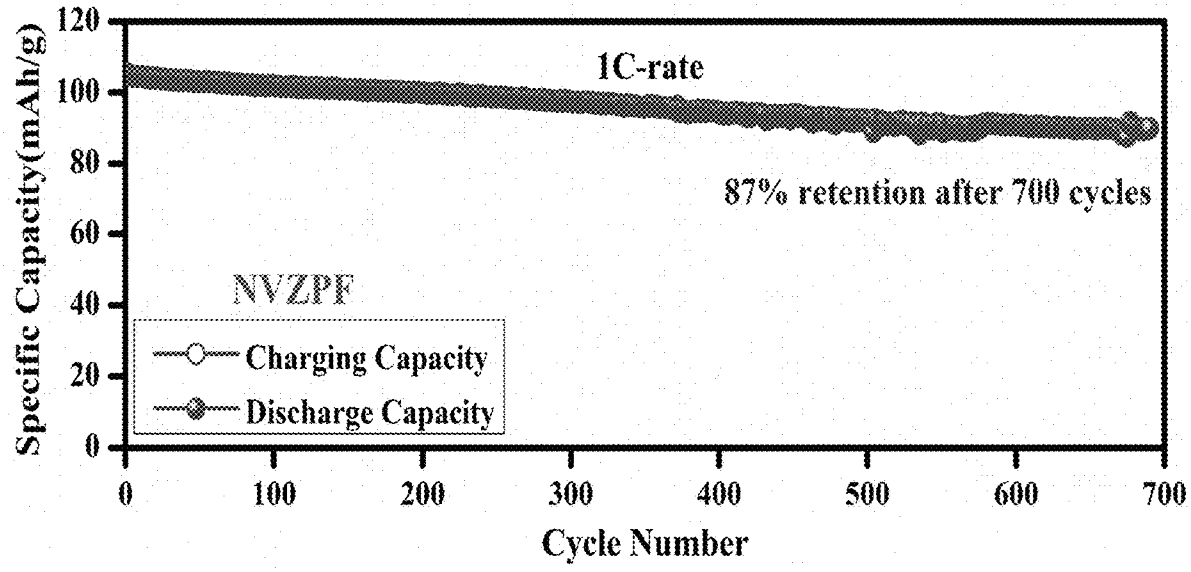
FIGS. 7(*a*) to (*c*) show the cycle performance of NVZPF material at current density of 1C, 5C and 10C, respectively, in accordance with an embodiment of the present invention.
Figure 7B:
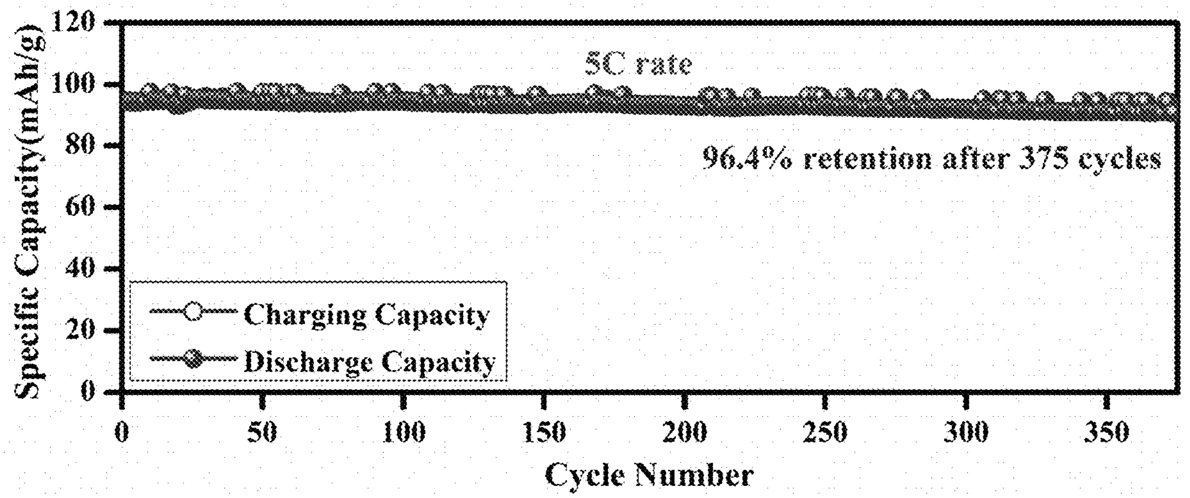
Figure 7C:
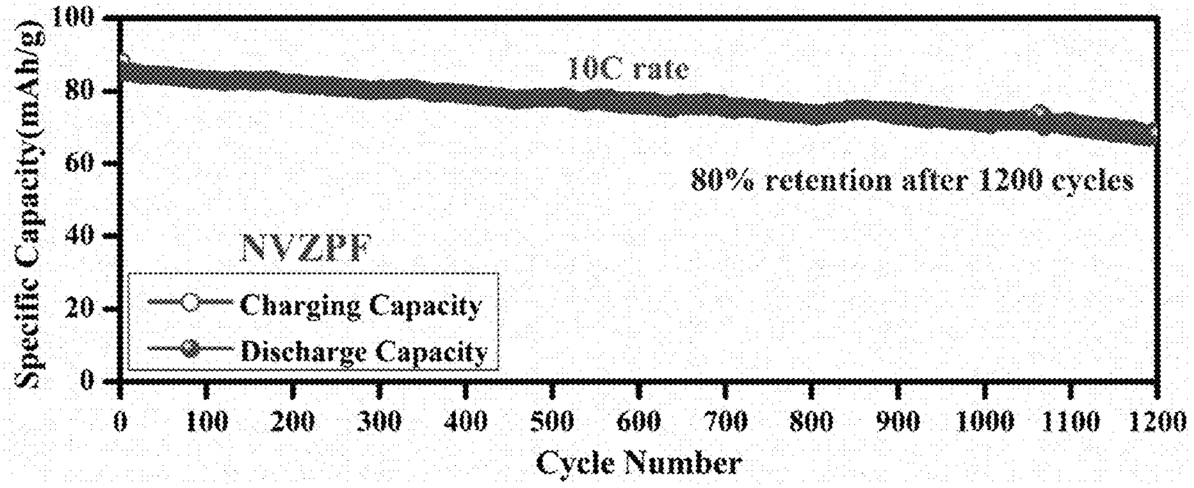

FIGS. 7(*a*) to (*c*) represent the cycle life performance of NVZPF at 1C, 5C, and 10C rates. At 1C, NVZPF has 87% retention after 700 cycles. At 5C, it possesses 96.4% retention after 375 cycles and at very high C-rate of 10C, the material retained the capacity of 80% even after 1200 cycles.

From the foregoing, it can be concluded that the electrode active material and the electrode material in accordance with the present invention is superior in terms of its electrochemical properties, when compared with NVP and/or NVZP materials known in the art.

We claim:

1. An electrode active material of formula 1

$$A_{(3+x)}V_{(2-x)}B_x(PO_4)_{(3-(y/3))}C_y \quad (1)$$

wherein,
A is selected from the group consisting of Li, Na and K,
B is a transition metal, a post-transition metal, or an alkaline earth metal,
C is selected from the group consisting of F, Cl, Br and I,
V is vanadium,
$PO_4$ is phosphate,
x is a real number ranging between 0.001 to 1.0, and
y is a real number ranging between 0.001 to 1.0.

2. The electrode active material according to claim 1, wherein B is selected from the group consisting of Mg, Ti, Cr, Al, Fe, Bi, Sr, Mn, Co, Ni, Cu, Zn, Sc, Tc, Pd, Mo, Sn, and W.

3. The electrode active material according to claim 1, wherein x ranges between 0.01 to 0.5.

4. The electrode active material according to claim 1, wherein y ranges between 0.01 to 0.2.

5. A method for producing the electrode active material of formula 1

$$A_{(3+x)}V_{(2-x)}B_x(PO_4)_{(3-(y/3))}C_y \quad (1)$$

wherein,
A is selected from the group consisting of Li, Na and K,
B is a transition metal, a post-transition metal, or an alkaline earth metal,
C is selected from the group consisting of F, Cl, Br and I,
V is vanadium,
$PO_4$ is phosphate,
x is a real number ranging between 0.001 to 1.0, and
y is a real number ranging between 0.001 to 1.0,
the method comprising:
(a) obtaining a solution comprising precursors of A, B, C, V, and $PO_4$,
(b) mixing the solution at a temperature in a range of 60° C. to 120° C. to obtain a gel,
(c) drying the gel by freeze drying, and
(d) calcining the dried gel to obtain the electrode active material.

6. The method according to claim 5, wherein the step of drying is carried out at a temperature in a range of −30° C. to −55° C.

7. The method according to claim 5, wherein the solution further comprises a carbon source selected from the group consisting of citric acid, glucose, sucrose, fructose, ascorbic acid, lignin, polysaccharide, hydrolyzed starch, dextrin, and molasses.

8. The method according to claim 5 further comprising the step of grinding the dried gel, prior to the step of calcining the dried gel.

9. An electrode material for metal ion battery comprising the electrode active material of formula 1

$$A_{(3+x)}V_{(2-x)}B_x(PO_4)_{(3-(y/3))}C_y \quad (1)$$

wherein,
A is selected from the group consisting of Li, Na and K,
B is a transition metal, a post-transition metal, or an alkaline earth metal,
C is selected from the group consisting of F, Cl, Br and I,
V is vanadium,
$PO_4$ is phosphate,
x is a real number ranging between 0.001 to 1.0, and
y is a real number ranging between 0.001 to 1.0.

10. The electrode material according to claim 9, wherein the electrode material further comprises a binder.

11. The electrode material according to claim 9, wherein the electrode material further comprises an electrically conductive material selected from carbon black, acetylene black, ketjen black, reduced graphene oxide, and carbon nanotube.

* * * * *